UNITED STATES PATENT OFFICE.

LOUIS KNAFFL, OF VIENNA, AUSTRIA-HUNGARY, ASSIGNOR TO THEODORE M. SCHLEIER, OF NASHVILLE, TENNESSEE.

PROCESS OF MANUFACTURING GLASS.

SPECIFICATION forming part of Letters Patent No. 295,410, dated March 18, 1884.

Application filed June 27, 1883. (No specimens.)

*To all whom it may concern:*

Be it known that I, LOUIS KNAFFL, a subject of the Emperor of Austria-Hungary, in Europe, residing at Vienna, Empire of Austria-Hungary, have invented a new and useful Process of Manufacturing Glass and a new Glass, of which the following is a specification.

My invention relates to a new process of manufacturing glass by the use of phosphoric acid, and the production of a new article of glass.

Heretofore in the manufacture of glass it has been necessary and the custom to use such ingredients as silica, boric acid, potash, soda, lime, and lead.

The object of my invention is, first, to provide a process of manufacturing glass by the use of phosphoric acid and dispensing with ingredients heretofore used in the manufacture of glass; second, to furnish, as a new article of manufacture, a glass composed of few ingredients, having superior qualities, readily produced, and formed in any desired shape and easily amalgamated with metals. I attain these objects in the following manner:

I take a quantity of boiling aqueous solution of ortho-phosphoric acid and add to it granulated metallic zinc so long as the zinc continues to dissolve with the development of hydrogen gas. This will form a mono base of zinc phosphate. This mono base of zinc phosphate is then neutralized with caustic baryta or strontium or calcium oxides or other suitable neutralizing agents. (I prefer, however, to use caustic baryta.) By this neutralization is formed the three-base zinc baryta phosphate. I then evaporate this three-base to dryness and subsequently melt it in a suitable vessel to a cherry-red heat, which, when in a fluid state, will be my new glass in a melted condition, and can be poured into any form or shape for future use, or can at once be molded or made use of, the glass thus formed being a poly-phosphate, or my new glass. After the melted mass has hardened, it can by the application of heat be remelted into its former liquid state, to be used for any purpose, the heat required being a much lower temperature than that required to melt glass manufactured by the old methods.

Some of the striking advantages of my new glass are that it contains no silica, boric acid, potash, soda, or lead; it is of a higher luster and has greater refractive powers than other glass, thereby being of great value for optical purposes; it is perfectly white, clear, and transparent, and can be ground and polished; it is insoluble in water, and neutral, and can be attacked only by hydrochloric acid or nitric acid, and cannot be affected by hydrofluoric acid, as is the case with other glass; it is easily fusible in the flame of a candle, and can be made of any color; it is of such a nature that it can be readily amalgamated with metals, and can be used for glazing articles of glass or porcelain, metals, or other materials.

Having described my invention, what I claim as new, and desire to secure by Letters Patent, is—

1. The process of producing a clear and transparent as well as opaque and colored glass, which consists in the action of barium or strontium or calcium oxides upon zinc phosphate, substantially as described and set forth.

2. The process of producing glass by the use of phosphoric acid, substantially as set forth and described.

3. The process of producing glass by neutralizing zinc phosphate, evaporating to dryness, and then heating to a cherry-red heat, substantially as described and set forth.

4. As a new article of manufacture, a glass produced by the use of phosphoric acid, substantially as set forth and described.

5. As a new article of manufacture, a glass produced by the action of barium or strontium or calcium oxides upon zinc phosphate, substantially as described and set forth.

In testimony whereof I affix my signature in presence of two witnesses.

LOUIS KNAFFL.

Witnesses:
CLARENCE M. HYDE,
JAMES RILEY WEAVER.